United States Patent
Van Gaasbeck

(10) Patent No.: US 9,710,180 B1
(45) Date of Patent: Jul. 18, 2017

(54) METHOD AND SYSTEM FOR CONTROLLING WEAR LEVEL OPERATIONS IN SOLID STATE MEMORY

(71) Applicant: EMC Corporation, Hopkinton, MA (US)

(72) Inventor: Richard H. Van Gaasbeck, Mountain View, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/199,092

(22) Filed: Jun. 30, 2016

Related U.S. Application Data

(60) Provisional application No. 62/339,634, filed on May 20, 2016.

(51) Int. Cl.
  G11C 29/00 (2006.01)
  G06F 3/06 (2006.01)
  G06F 12/1018 (2016.01)

(52) U.S. Cl.
  CPC .......... *G06F 3/0619* (2013.01); *G06F 3/0623* (2013.01); *G06F 3/0652* (2013.01); *G06F 3/0688* (2013.01); *G06F 12/1018* (2013.01)

(58) Field of Classification Search
  CPC . G11C 13/0023; G11C 16/10; G11C 16/3404; G11C 8/08
  See application file for complete search history.

(56) References Cited

U.S. PATENT DOCUMENTS

| | | | |
|---|---|---|---|
| 8,041,884 B2* | 10/2011 | Chang | G11C 16/10 365/185.33 |
| 8,700,840 B2* | 4/2014 | Paley | G06F 12/0246 365/185.03 |
| 8,891,303 B1* | 11/2014 | Higgins | G11C 16/10 365/185.1 |
| 2009/0168505 A1* | 7/2009 | Hanzawa | G11C 13/0004 365/163 |
| 2010/0172180 A1* | 7/2010 | Paley | G06F 12/0246 365/185.12 |
| 2011/0299317 A1* | 12/2011 | Shaeffer | G11C 13/0002 365/106 |
| 2014/0219034 A1* | 8/2014 | Gomez | G11C 16/06 365/185.22 |
| 2014/0226413 A1* | 8/2014 | Gomez | G11C 16/3454 365/185.22 |

(Continued)

OTHER PUBLICATIONS

Qureshi et al.; "Enhancing Lifetime and Security of PCM-Based Main Memory with Start-Gap wear Leveling"; IBM Research, T.J. Watson Research Center; {moinqureshi, franceschini, viji, lastrasl, abali, karidis}@us.ibm.com; Dec. 12, 2009; 10 pages.

*Primary Examiner* — Tuan T Nguyen
(74) *Attorney, Agent, or Firm* — Chamberlain, Hrdlicka

(57) ABSTRACT

A method for controlling wear level operations in solid state memory. The method includes receiving a request to write to a memory location identified by a write address of the solid state memory, generating a write address hash from the write address, making a first determination that a write history for a memory region includes the write address hash, and based on the first determination: clearing the write history, storing the write address hash in the write history, and making a second determination that a wear level operation is due, and based on the second determination: performing the wear level operation.

23 Claims, 9 Drawing Sheets

(56) References Cited

U.S. PATENT DOCUMENTS

| | | | |
|---|---|---|---|
| 2014/0369124 A1* | 12/2014 | Moon | G11C 16/16 365/185.11 |
| 2015/0221358 A1* | 8/2015 | Brandl | G11C 11/4087 365/222 |
| 2016/0027481 A1* | 1/2016 | Hong | G11C 7/00 714/807 |
| 2016/0148700 A1* | 5/2016 | Oh | G06F 11/34 365/185.12 |

* cited by examiner

METHOD AND SYSTEM FOR CONTROLLING WEAR LEVEL OPERATIONS IN SOLID STATE MEMORY

CROSS-REFERENCE TO RELATED APPLICATIONS

This application claims priority to U.S. Provisional Patent Application No. 62/339,634 filed May 20, 2016, the entire disclosure of which is hereby expressly incorporated by reference herein.

BACKGROUND

Solid state memory storage devices may be used to store data. Such solid state storage devices may be based on solid state memory such as, for example, Phase Change Memory (PCM) and Spin Torque Magnetic Random Access memory, that degrades as data are written to the memory. Only a limited number of writes to solid state memory may thus be permissible before the solid state memory loses its ability to reliably retain data. Repeated writes to the same memory location may prematurely wear out the memory location, while other memory locations of the solid state memory may still be intact.

DETAILED DESCRIPTION

Figure 1A:
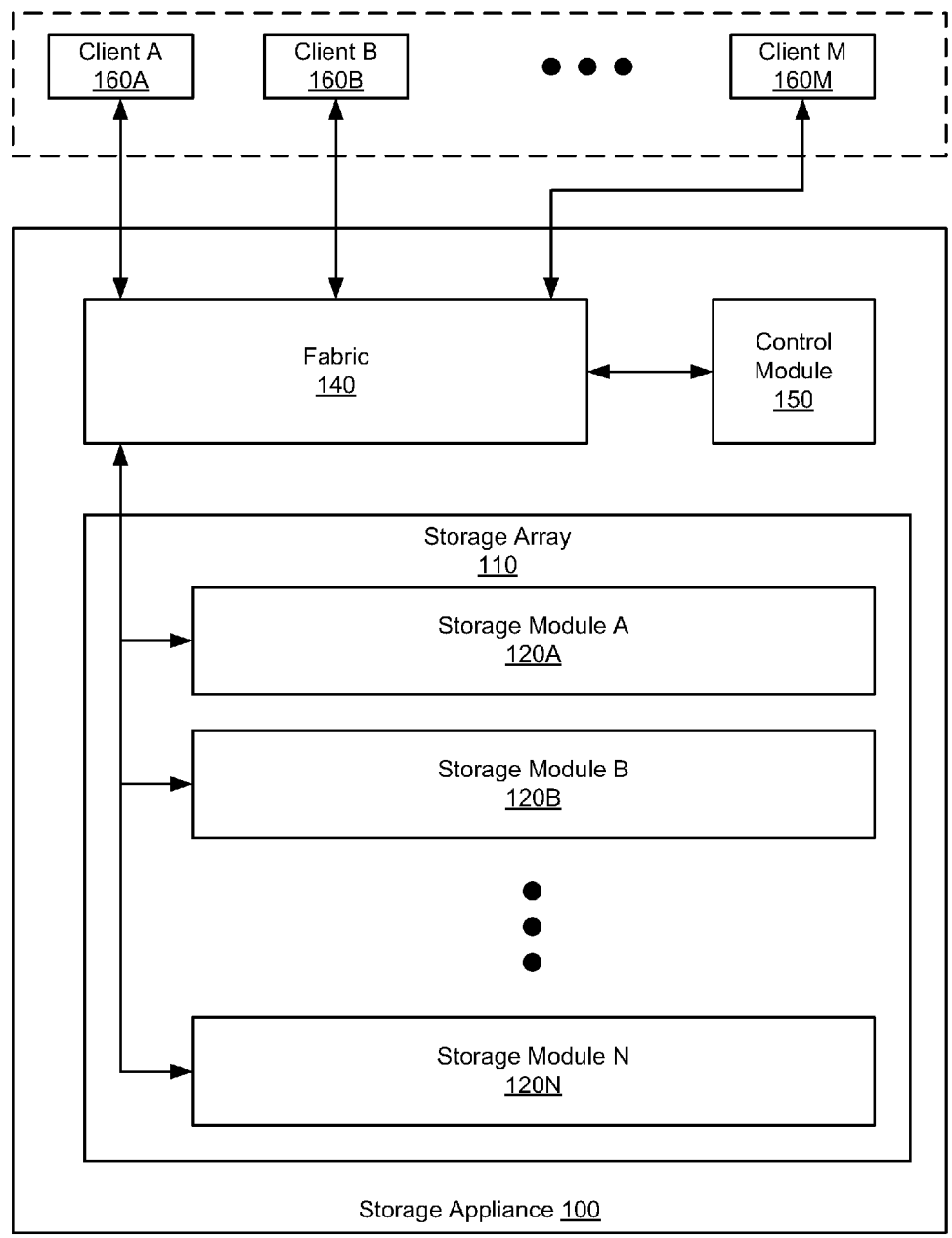
FIGS. 1A and 1B show systems, in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-6B, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to reducing uneven wear of solid state memory. Uneven wear may result from some data being written to memory locations of the solid state memory region more frequently than other data being written to other memory locations. Repetitive writes to a memory location may ultimate result in failure of that memory location. Only a limited number of writes to solid state memory may thus be permissible to a memory location before the memory location loses its ability to reliably retain data. The permissible number of writes or program-erase cycles of a single memory location in solid state memory may be reported as a write endurance, e.g., in thousands or millions of writes or program-erase cycles. While repeated writes to the same memory location may prematurely wear out the memory location, other memory locations of the solid state memory may still be intact. Accordingly, the methods and systems described below aim to reduce uneven wear resulting from repeated writes to particular memory locations by periodically performing wear level operations. The wear level operations periodically relocate data within the memory region to avoid that frequently written data are always written to the same memory locations. More specifically, methods and systems in accordance with one or more embodiments of the technology determine when a wear level operation is to be performed, based on the detection of repeated writes to the same memory location(s).

Figure 1B:
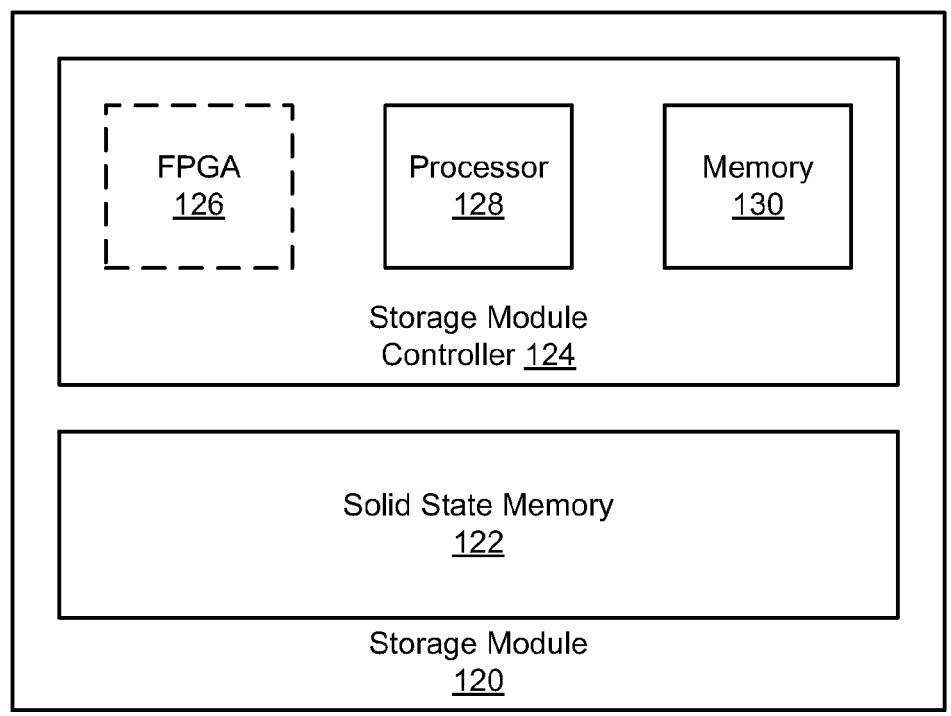

FIGS. 1A and 1B show systems in accordance with one or more embodiments of the technology. Referring to FIG. 1A, the system includes one or more clients (client A (160A)-client M (160M)) that are operatively connected to a storage appliance (100).

In one embodiment of the technology, the clients (160A-160M) may be any type of physical system that includes functionality to issue a read request to the storage appliance (100) and/or to issue a write request to the storage appliance (100). Though not shown in FIG. 1A, each of the clients (160A-160M) may include a client processor (not shown), client memory (not shown), and any other software and/or hardware necessary to implement one or more embodiments of the technology.

In one embodiment of the technology, the clients (160A-160M) are configured to execute an operating system (OS) that includes a file system, a block device driver, an application programming interface (API) to enable the client to access the storage appliance, and/or a user programming library. The file system, the block device driver and/or the user programming library provide mechanisms for the storage and retrieval of files from the storage appliance (100).

More specifically, the file system, the block device driver and/or the user programming library include functionality to perform the necessary actions to issue read requests and write requests to the storage appliance. They may also provide programming interfaces to enable the creation and deletion of files, reading and writing of files, performing seeks within a file, creating and deleting directories, managing directory contents, etc. In addition, they may also provide management interfaces to create and delete file systems. In one embodiment of the technology, to access a file, the operating system (via the file system, the block device driver and/or the user programming library) typically provides file manipulation interfaces to open, close, read, and write the data within each file and/or to manipulate the corresponding metadata.

In one embodiment of the technology, the clients (160A-160M) interface with the fabric (140) of the storage appliance (100) to communicate with the storage appliance (100), as further described below.

In one embodiment of the technology, the storage appliance (100) is a system that includes persistent storage such as solid state memory, and is configured to service read requests and/or write requests from one or more clients (160A-160M).

The storage appliance (100), in accordance with one or more embodiments of the technology, includes one or more storage modules (120A-120N) organized in a storage array (110), a control module (150), and a fabric (140) that interfaces the storage module(s) (120A-120N) with the clients (160A-160M) and the control module (150). Each of these components is described below.

The storage array (110), in accordance with an embodiment of the technology, accommodates one or more storage modules (120A-120N). The storage array may enable a modular configuration of the storage appliance, where storage modules may be added to or removed from the storage appliance (100), as needed or desired. A storage module (120), in accordance with an embodiment of the technology, is described below, with reference to FIG. 1B.

Continuing with the discussion of the storage appliance (100), the storage appliance includes the fabric (140). The fabric (140) may provide connectivity between the clients (160A-160M), the storage module(s) (120A-120N) and the control module (150) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the technology is not limited to the aforementioned protocols.

Further, in one or more embodiments of the technology, the storage appliance (100) includes the control module (150). In general, the control module (150) is a hardware module that may be configured to perform administrative tasks such as allocating and de-allocating memory regions in the solid state memory modules (120A-120N) and making allocated memory regions accessible to the clients (160A-160M). Further, the control module may perform one or more steps to balance the wear within a memory region and/or to migrate the content of a worn memory region to a different memory region. In one embodiment of the technology, these functions (e.g., one or more of the steps described in FIGS. 3 and 4) are performed by the control module (150).

The control module (150) interfaces with the fabric (140) in order to communicate with the storage module(s) (120A-120N) and/or the clients (160A-160M). The control module may support one or more of the following communication standards: PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE), or any other communication standard necessary to interface with the fabric (140).

FIG. 1B shows a storage module, in accordance with one or more embodiments of the technology. The storage module (120) includes solid state memory (122) to persistently store data. In one embodiment of the technology, the solid state memory (122) of the storage module (120) may include, but is not limited to, Spin Torque Magnetic Random Access Memory (ST-RAM) and Phase Change Memory (PCM). Generally, the solid state memory (122) may correspond to any type of memory that has a finite number of program-erase cycles or write cycles. In one or more embodiments of the technology, the limited number of program-erase or write cycles necessitates the use of methods to avoid excessive writes to the same region of the solid state memory in order to prevent data loss, as described in detail below.

Continuing with the discussion of the storage module (120), shown in FIG. 1B, the storage module (120), in accordance with one or more embodiments of the technology, further includes a storage module controller (124). In one embodiment of the technology, the storage module controller (124) is configured to receive and service requests to read from and/or write data to the solid state memory (122). These requests may originate from the clients (160A-160M) or from the control module (150), and may be conveyed to the storage module controller (124) via the fabric (140). Further, the storage module controller (124) may perform or may support administrative tasks including the methods described in FIGS. 3 and 4.

Figure 3:
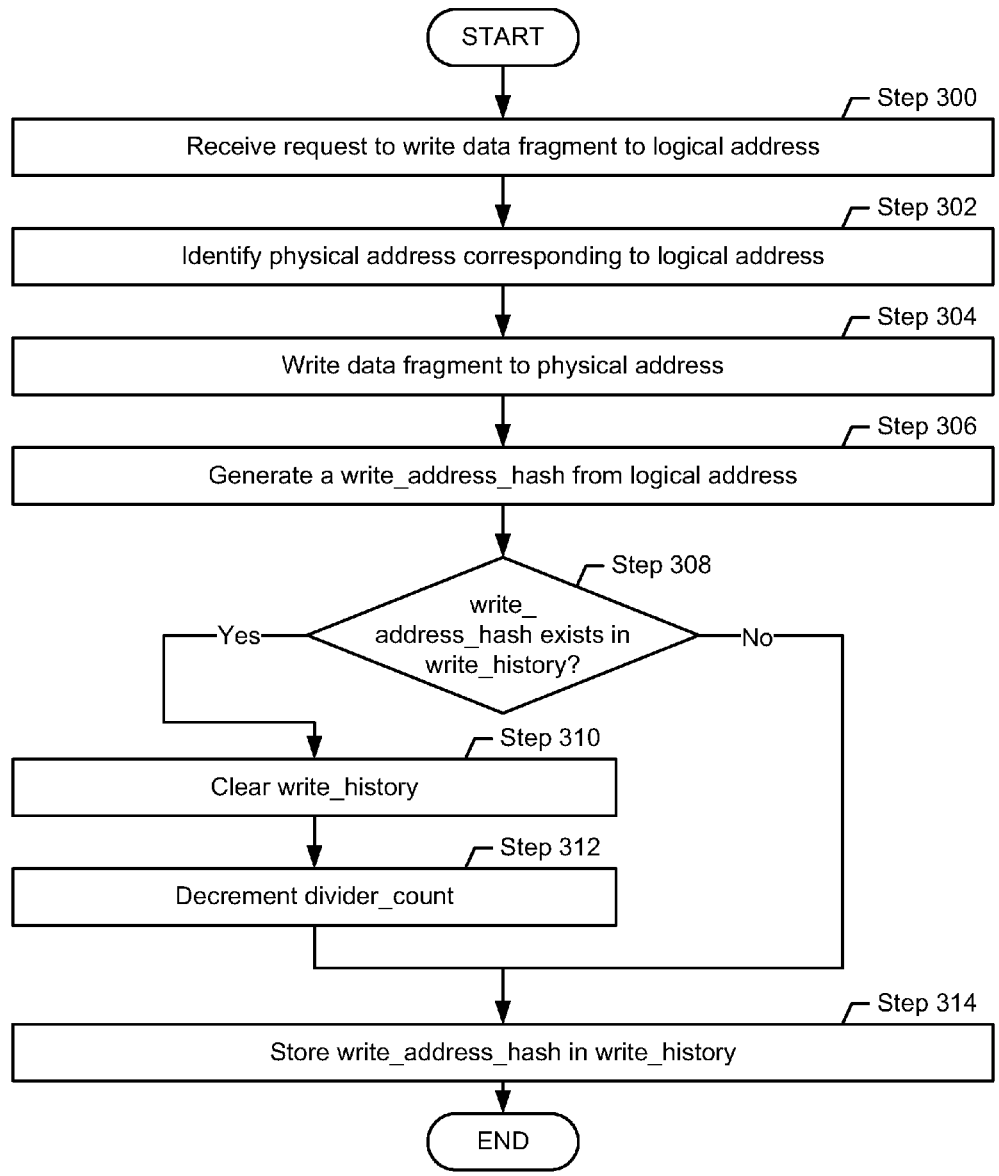
FIGS. 3 and 4 show flowcharts, in accordance with one or more embodiments of the technology.
Figure 4:
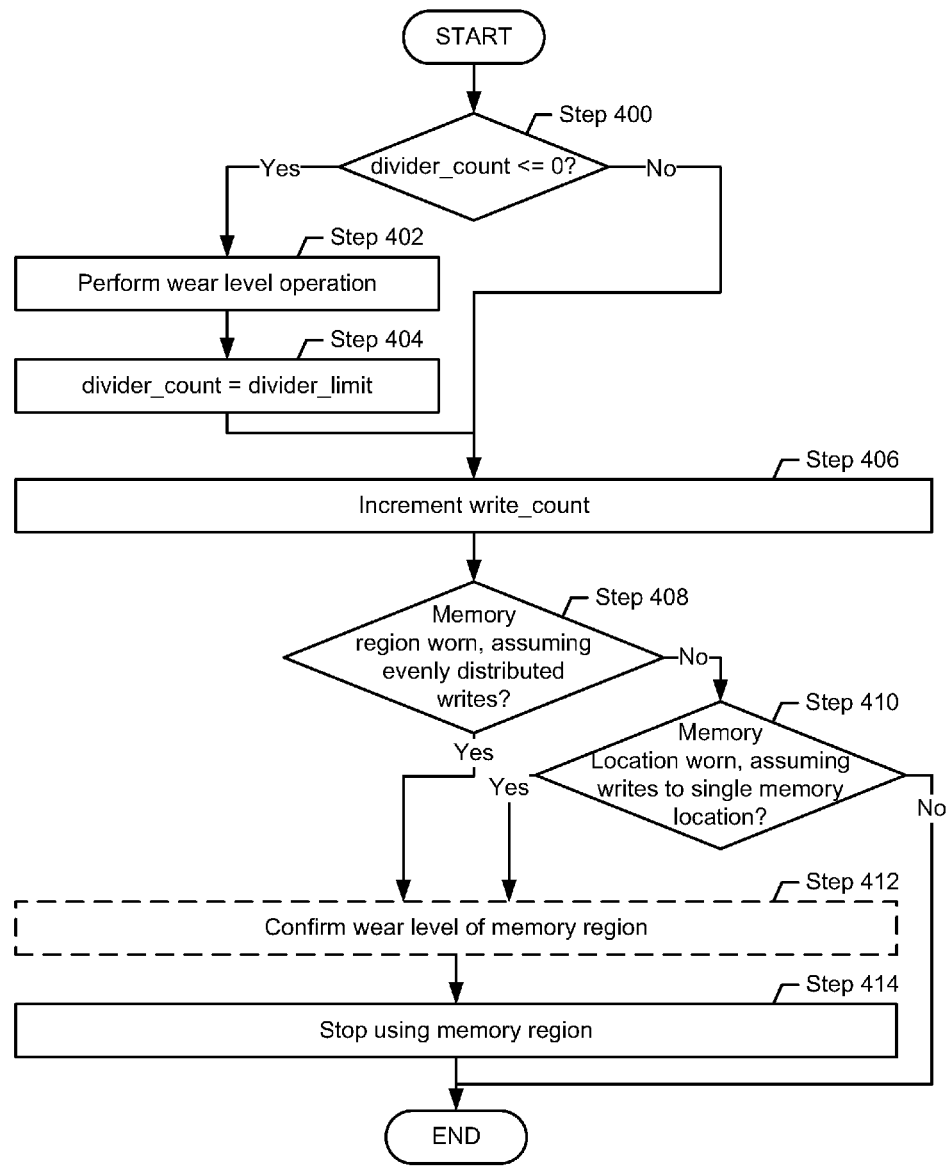

In one embodiment of the technology, the storage module controller (124) includes a processor (128) (e.g., one or more cores, or micro-cores of a processor that are configured to execute instructions) and memory (130) (e.g., volatile memory that may be, but is not limited to, dynamic random-access memory (DRAM), synchronous DRAM, SDR SDRAM, and DDR SDRAM) to perform at least one of the steps described in FIGS. 3 and 4. Alternatively or additionally, the storage module controller (124) may include a field-programmable gate array (FPGA) and/or an application-specific integrated circuit (ASIC) (126). In a storage module controller that includes an FPGA and/or ASIC and a processor, the FPGA and/or ASIC may primarily service read and write requests, whereas the processor may handle or support administrative tasks, including those related to wear leveling and/or data migration, as further described below.

One skilled in the art will recognize that the architecture of the system is not limited to the components shown in FIGS. 1A and 1B. For example, the components of the storage appliance (100) may include any number of storage modules (120A-120N). Further, the storage module controller (124) of the storage module (120) and the control module (150) of the storage appliance (100) may be equipped with central processing units (CPUs), field-programmable gate arrays (FPGAs), application-specific integrated circuits (ASICs) and/or any other type of processor, without departing from the technology. In addition, the fabric may be based on communication standards other than those discussed above, without departing from the technology.

Figure 2A:
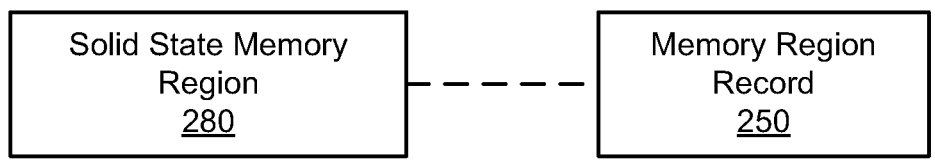
FIGS. 2A-2C show an organization of solid state memory, in accordance with one or more embodiments of the technology.
Figure 2B:
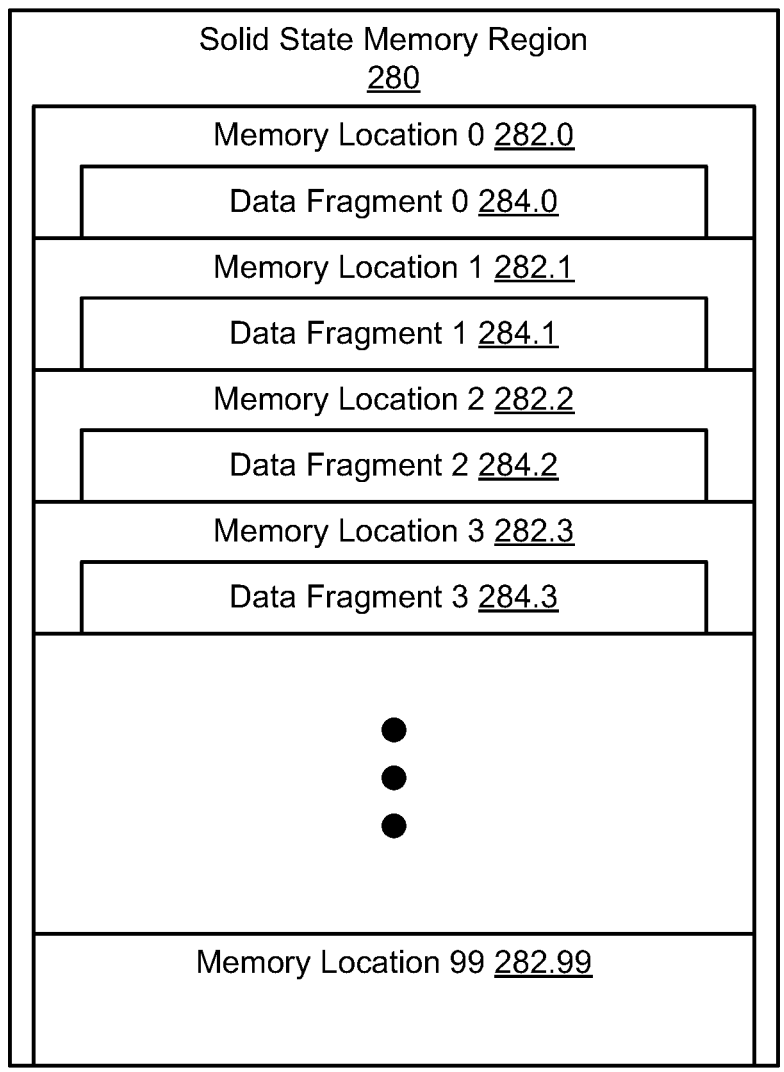
Figure 2C:
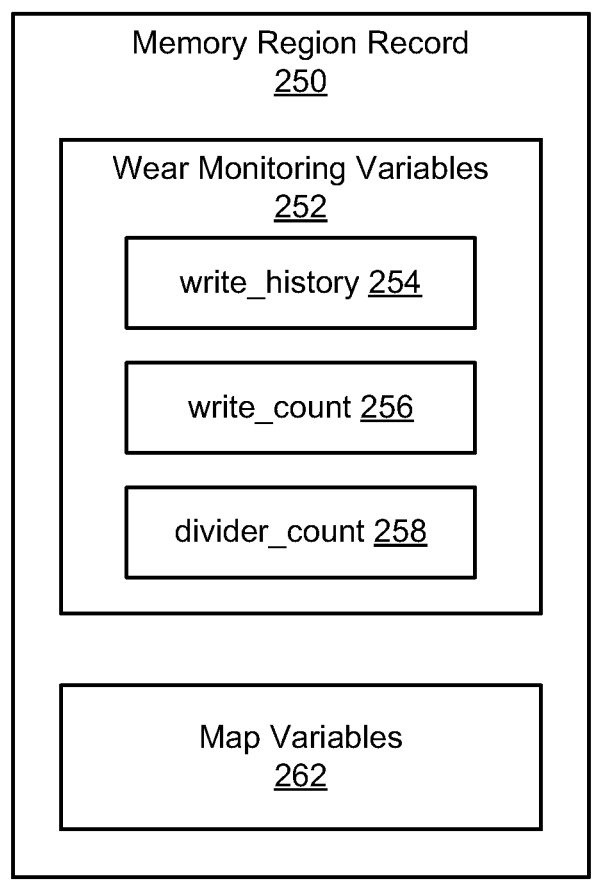

FIG. 2A-2C show an organization of solid state memory, in accordance with one or more embodiments of the technology. FIG. 2A shows solid state memory region (280) and an associated memory region record (250). The solid state memory region (280) may be a memory region allocated in the solid state memory (122) of a storage module (120) and may be used to accommodate data. The solid state memory region may be of any size and may be structured in any way. The solid state memory region (280) may be addressed and maintained using elements of the memory region record (250), as further described below.

FIG. 2B shows an exemplary physical representation of data in a solid state memory region (280). Data in the solid state memory region (280) may be stored as data fragments (284) in memory locations (282) of the solid state memory region (280). The exemplary solid state memory region in FIG. 2B includes 100 memory locations (282.0-282.99) to accommodate 100 data fragments. Each memory location may be a sub region of a specified size, in the solid state memory region. A memory location may include a specified number of bits (e.g., if a memory location is configured to store a single variable only), or it may span larger regions, e.g., bytes, kilobytes, megabytes, etc. The size of a memory location may also be specific to the type of solid state memory being used. In one embodiment of the technology, a memory location is the smallest individually addressable memory unit in the solid state memory region (280). A memory location may be occupied by a data fragment (e.g., data fragments 0-3 (284.0-284.3), or it may be empty (e.g., memory location 99 (282.99). A combination of data fragments may form a storage object, e.g., a data file. The data fragments of a storage object may or may not be in consecutive order and/or they may be interrupted by one or more gaps. Further, the order and/or location of the data fragments may change over time, e.g., when a wear level operation is performed.

One skilled in the art will recognize that solid state memory regions are not limited to the exemplary solid state memory region shown in FIG. 2B. For example, the size and/or the organization of the solid state memory region may vary.

Turning to FIG. 2C, a memory region record is shown. A memory region record (250), in accordance with one or more embodiments of the technology, includes wear monitoring variables (252) and map variables (262) for a specific memory region. The memory region record (250) may be stored in the memory (130) of the storage module controller (124) and may be relied upon by the FPGA (126) and/or the processor (128) to determine the need for wear level operations and to direct read and/or write operations to the appropriate region in the solid state memory (122) of the storage module (120).

The wear monitoring variables (252) may be used to track the wear of memory locations and to initiate wear level operations when deemed necessary, as described below with reference to FIGS. 3 and 4. The wear monitoring variables may include, but are not limited to, a variable write_history (254), a variable write_count (256) and a variable divider_count (258).

write_history (254), in accordance with one or more embodiments of the technology, is used to detect repeated writes to the same memory location of the solid state memory region. When a write to a particular memory location is detected, an entry is made in the write_history variable, for the memory location. Whenever a write to a memory location is performed, write_history may be queried in order to determine whether a previous write had already been performed to the memory location. In one embodiment of the technology, the address of the memory location that is being written to is stored in write_history as a hash value. One or more hash values may be generated by one or more hash functions from the write address of the memory location. The one or more hash values may be within a range that is based on the choice and parameterization of the hash function(s) being used. The size of write_history is chosen accordingly. Consider for example, a scenario in which a solid state memory region includes 32,000 memory locations. Rather than registering write activity separately for each of the 32,000 memory locations, the address of a memory location that is being written to may be provided to the hash function to obtain a hash value in a limited range, e.g., in a range from 0 to 63. In the described exemplary scenario, a set of 64 bits is used to encode hash values. Assume, for example, that the hash value for the first memory location of the 32,000 memory locations, generated by a first hash function is "0". Accordingly, the first bit of the 64 bit write_history would be set to "1". Further assume that the hash value for the first memory location of the 32,000 memory locations, generated by a second hash function is "49". Accordingly, the $50^{th}$ bit of the 64 bit write_history would also be set to "1". write_history may thus be used as a compact representation for documenting writes to a comparatively large memory region. The use of hash values and write_history to represent memory locations that are being written to is further described below in FIG. 3.

write_count (256), in accordance with one or more embodiments of the technology, is used to track the number of writes that have occurred in the memory region, e.g., over the lifetime of the memory region. Each time a write is performed, "write_count" may be incremented. The use of "write_count" is further described below in FIG. 4.

divider_count (258), in accordance with one or more embodiments of the technology, is used to control the frequency of wear level operations to be performed. divider_count may be decremented with each detected set of duplicate writes. If, for example, divider_count==0 triggers the execution of a wear level operation, a current divider_count value of "5" may indicate that five duplicate writes must occur prior to triggering the execution of a wear level operation. The use of divider_count is further described below in FIGS. 3 and 4. Prior to the execution of the methods of FIGS. 3 and 4, divider_count may be initialized to a value specified by divider_limit.

The map variables (262) may be used to establish a mapping between logical addresses used, e.g., by clients (160) to address memory locations when reading from or writing to the memory locations and the actual physical addresses of the memory locations of the memory region. The logical to physical mapping enabled by the map variable (262) may establish offsets between logical and physical addresses, may implement address randomization, etc. The map variables (262) may include, for example, entries that specify a physical start address of the memory region, the size of the memory region, the memory location of a first data fragment of a series of consecutive data fragments, etc. The composition of the map variables (262) may depend on the type of wear level algorithm being used. For example, the map variables may also include an entry for the location of one or more gaps that may be used to periodically relocate data fragments to different memory locations when performing a wear level operation. The map variables may change when a wear level operation is performed, in order to update the mapping between logical and physical representations, to reflect the updated organization of data fragments in the memory region.

FIGS. 3 and 4 show flowcharts in accordance with one or more embodiments of the technology. FIG. 3 shows a method for detecting duplicate writes to memory locations in a solid state memory region. FIG. 4 shows a method for managing the solid state memory region, once duplicate writes are detected, to mitigate the effects of wear of the solid state memory region. While the flowcharts of FIGS. 3 and 4 describe the mitigation of wear in a solid state memory region caused by write operations, additionally or alternatively, read operations performed on the solid state memory region may also wear out the solid state memory region. Accordingly, the subsequently described methods may also be performed to mitigate the effects of wear caused by read operations.

The methods of FIGS. 3 and 4 may be repetitively executed, e.g., each time when a write request is received. While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 3 and 4 may be performed in parallel with any other steps shown in FIGS. 3 and 4 without departing from the technology.

FIG. 3 shows a method for detecting duplicate writes to memory locations in a solid state memory region.

Turning to FIG. 3, in Step 300, a write request to write a data fragment to a solid state memory region is received. The write request may use a logical address to indicate the memory location to be addressed. The write request may have been received from a client attempting to write to the solid state memory of the storage appliance. The request may be received by the storage appliance and may reach the storage module controller of the storage module to which the client is attempting to write. The request, in accordance with an embodiment of the technology, includes a data fragment to be written and a logical address to be written to (e.g., memory location 1, 2, 3, etc., as illustrated in FIG. 2B).

In Step 302, the physical address corresponding to the logical address is identified. This address translation may enable the storage appliance to identify the memory location where the data fragment is to be stored in a particular storage module. The address translation may be performed by the storage module controller, e.g., by an FPGA of the storage module controller that may be specialized in rapidly performing logical to physical address translations during write or read operations. The address translation may be based on the mapping established by the map variables in the memory region record.

In Step 304, the data fragment is written to the memory location identified by the physical address of the memory location in the solid state memory region.

In Step 306, a write address hash, "write_address_hash", is generated from the logical address received in Step 300. Alternatively, the write address hash may be generated from the physical address corresponding to the logical address. The write address hash may include one or more hash values. Each of the hash values may be generated from the write address, using hash functions configured to generate hash values that are independent from one another. In one embodiment of the technology, two hash values are generated by two independent hash functions. In one embodiment of the technology, the output of the hash functions is in a specified range, e.g., 0 . . . 63. Any hash function capable of accepting write addresses in the range of the solid state memory region and capable of producing hash values of the specified output size may be used.

In Step 308, a determination is made about whether write_address_hash exists in the write history, stored in the "write_history" variable. Consider, for example, a scenario in which write_address_hash=22. To make the determination about whether the write address hash exists in the write history, the $23^{rd}$ bit (representing the value "22", in a zero-based representation) of write_history is inspected. If, in Step 306, multiple hash values, generated by multiple hash functions, are used to represent a write address, the determination in Step 308, in accordance with an embodiment of the technology, verifies whether all hash values of write_address_hash exist in write_history. Only if all hash values exist in write_history, the determination that write_address_hash exists in write_history may be made.

If a determination is made that write_address_hash exists in write_history, the method may proceed to Step 310, where write_history is cleared, e.g. by setting all values of write_history to "0". If write_address_hash does not exist in write_history, the method may directly proceed to Step 314.

In Step 312, divider_count is decremented. In one embodiment of the technology, divider_count is decremented by "1".

Alternatively, the decrement is variable, in accordance with an embodiment of the technology. More specifically, the decrement may be probabilistically scaled, based on the likelihood that write_address_hash detected as existing in write_history, in Step 308, is a true positive rather than a false positive. A false positive may be resulting from the mapping of the many memory locations of a memory region to the relatively few bits of write_history. In such a mapping, multiple memory locations may be mapped to the same bits in the write_history. Accordingly, with an increasing number of memory locations having been stored in write_history, a query of write_history in Step 308 is increasingly likely to result in a false positive. To discount false positive reportings, divider_count, in Step 312 may be decremented by an amount less than 1.

The decrement to be applied may be determined as follows. First, the probability of a true positive is calculated. The true positive probability, in accordance with an embodiment of the technology, depends on at least the size of write_history, the number of hash functions being used to encode a memory location, and the number of memory locations currently stored in write_history. Consider, for example, a scenario in which an 8-byte write_history is used. Further, assume that two separate hash functions are used for encoding memory locations to be stored in the write history. If a single memory location is currently stored in write_history and a second memory location is to be added to write_history, the determination of whether that second memory location already exists in the write history has a true positive probability of 99.9%. In other words, if a determination is made that the second memory location already exists in write_history, the probability that the actual memory location, in the memory region, was already written to is 99.9%. On the other hand, the probability that the memory location is wrongly reported is 0.1%. Accordingly, there is a small possibility that the reported duplicate write is not a duplicate write, and in fact, the first and the second writes were performed in different memory locations that map to the same encoding in write_history. With an increasing number of memory locations encoded in write_history, the probability of a false positives increases. Accordingly, in the above example, the true positive probability drops with each additional memory location in write history. For example, with two memory locations in write history, the true positive probability drops to 99.53%, with three memory locations in write history, the true positive probability drops to 98.71%, etc. Next, to accommodate the decreasing true positive probability, with only a single memory location being stored in write_history, divider_count may be decremented by "0.999", in Step 312. With two memory locations being stored in write_history, "0.9953" may be subtracted, etc. In order to choose the appropriate decrement to be applied, it may thus be necessary to track the number of writes that have occurred since the last clearing of write_history, e.g., using a counter.

In Step 314, write_address_hash is stored in write_history. In the previously-described scenario in which write_address_hash=22, the $23^{rd}$ bit of write_history would be set to "1".

FIG. 4 shows a method for managing the solid state memory region, once duplicate writes are detected, to mitigate the effects of wear of the solid state memory region.

Turning to FIG. 4, in Step 400, a determination is made about whether divider_count, as a result of the decrementing performed in Step 314 of FIG. 3, is less than or equal to zero. The determination thus assesses whether the number of writes to the same memory locations exceeds a repetitive write limit specified by divider_limit. If so, the method may proceed to Step 402.

In Step 402, a wear level operation is performed. The wear level operation, in accordance with an embodiment of the technology, reduces the uneven use of memory locations due to multiple writes to the same memory location by rearranging the data fragments into different memory locations. In one embodiment of the technology, the wear level operation includes a step-wise circular rotation of the data fragments in the memory region. In a single wear level operation, a memory fragment may, for example, be copied into an adjacent gap, i.e., to a memory location that is currently not being relied upon for data storage. Subsequently, the original memory location may become the gap. In the next wear level operation, the above described swapping of a memory location and a gap location may be repeated for the next data fragment adjacent to the gap. Repetition of these steps may eventually result in a shift of all data fragments relative to their original locations in the solid state memory region. Those skilled in the art will recognize that alternatively or in addition, any other wear level scheme may be employed to reduce premature aging of a memory location that is repeatedly being written to.

In Step 404, the divider_count variable is reset to divider_limit.

Returning to Step 400, if a determination is made that divider_count has not yet reached zero, the method may directly proceed to Step 406.

In Step 406, write_count is incremented in order to add the write operation that has been performed in Step 304 to the overall count of writes.

In Step 408, a determination is made about whether the memory region is worn, under the assumption of evenly distributed writes across the memory region. In one embodiment of the technology, the determination is made by comparing write_count to the product of the number of memory locations in the memory region and the memory location write endurance. If write count exceeds the number of memory locations multiplied by the write endurance, the assumption is that the memory region has reached its wear limit. In this case, the method may proceed to Step 412. If a determination is made that the memory region, under the assumption of evenly distributed writes across the memory region, has not yet reached its wear limit, the method may proceed to Step 410.

In Step 410, a determination is made about whether a particular memory location is worn, under the assumption that only this memory location is being written to repeatedly, while there are no other memory locations to which data is being written. In one embodiment of the technology, the determination is made by comparing the number of wear level operations that have been performed on the memory region to the memory location write endurance. The number of wear level operations may either be tracked using a counter, or it may be derived from certain characteristics of the memory region. For example, if wear level operations rely on a gap to enable the stepwise shifting of data fragments within the memory region, a comparison of the current gap location with the initial gap location and/or other tracked variables may allow the reconstruction of the number of wear level operations that have been performed. If a determination is made that the memory location is not worn, the execution of the method may terminate. If a determination is made that the memory location is worn, the method may proceed to Step 412.

While Steps 408 and 410 perform tests for the two "extreme" cases of entirely even distributed writes (Step 408) and writes to a single memory location only (Step 410), a combination of writes to the same memory location(s) and more evenly distributed writes to other memory locations may also occurr during operation of the storage appliance. Performing tests for the extreme cases may result in an early detection of a worn memory region at a point in time when failure of the memory region is not yet imminent.

In Step 412, the wear level of the memory region may be further assessed or monitored. Step 412 is optional. An assessment of the memory region may be performed by reading a data fragment after writing the data fragment. A read error may indicate that the memory region is failing. Further, error-correcting code (ECC) information may be analyzed after the read. Increasing reliance on ECC algorithms to correct read errors when reading data fragments may be an indication for a deteriorating memory region.

In Step 414, the use of the memory region is stopped to avoid data losses. A migration operation may be performed to copy data fragments of the memory region into a fresh memory region. After the migration, data may be read from and written to the fresh memory region, and the original memory region may be retired.

In one embodiment of the technology, the methods described in FIGS. 3 and 4 may be performed entirely within a storage module(s). In another embodiment of the technology, a portion of the methods described in FIGS. 3 and/or 4 may be performed on a storage module(s) while other portions of the methods described in FIGS. 3 and/or 4 may be performed by the control module.

EXAMPLE USE CASE

The use case scenario described below is intended to provide an example of the method for controlling wear level operations in solid state memory, described in FIGS. 3 and 4, and is for illustrative purposes only. The use case scenario is based on a system similar to the one shown in FIG. 1, in which data is written to/read from a memory region of a solid state memory module. One skilled in the art will recognize that the methods described in FIGS. 3 and 4 are not limited to the use case scenario described below, but rather are universally applicable to a wide range of solid state memory-based systems of different configuration, complexity and size.

Consider a scenario in which a wear level operation is to be performed after two duplicate writes to the same memory location (i.e., a total of three writes to the same memory location). Accordingly, divider_limit=2. In the subsequently described exemplary scenario, four bits are used to store hashed write addresses in write_history. Accordingly, write_history is four bits wide, and write_address_hash may be in the range from zero to three. Two independent hash functions are used to generate two separate hash values for a write address.

Figure 5A:
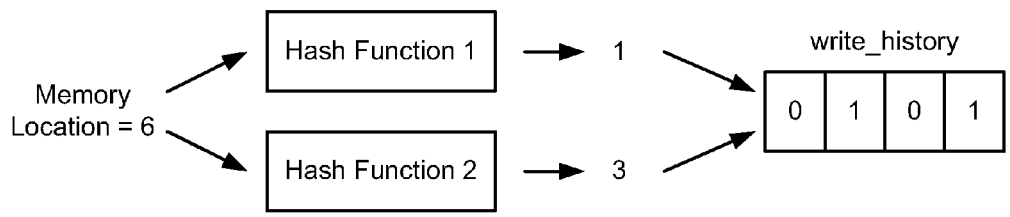
FIGS. 5A-5D shows exemplary repetitive write detections, in accordance with one or more embodiments of the technology.

Turning to FIG. 5A, the $6^{th}$ memory location of the memory region is written to. The hash value for the $6^{th}$ memory location, generated by the first hash function, is "1", whereas the hash value for the $6^{th}$ memory location, generated by the second hash function, is "3". Accordingly, bits two and four of write_history are set to "1", i.e., write_history becomes "0101". write_count is incremented.

Figure 5B:
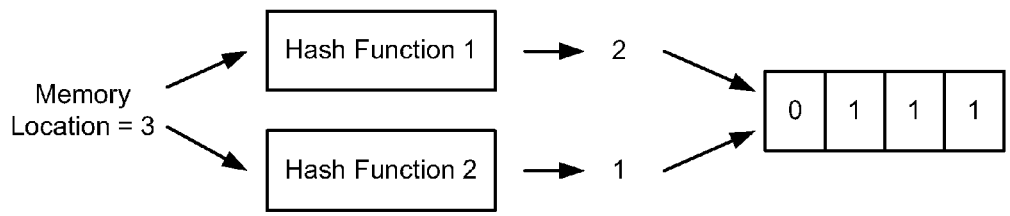

In FIG. 5B, the $3^{rd}$ memory location of the memory region is written to. The hash value for the $3^{rd}$ memory location, generated by the first hash function, is "2", whereas the hash value for the $3^{rd}$ memory location, generated by the second hash function, is "1". A determination is made that the output of the two hash functions does not yet exist in write_history. Accordingly, the bits two and three of write_history are set to "1", i.e., write_history becomes "0111". write_count is incremented.

Figure 5C:
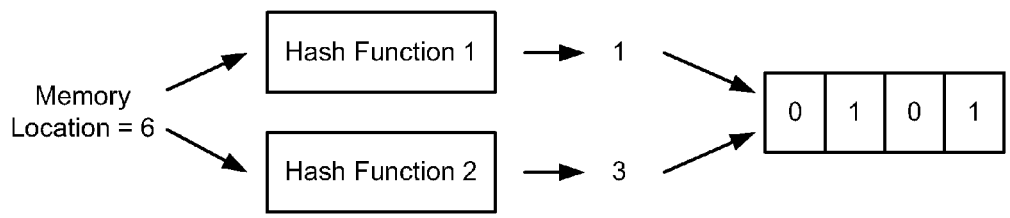

In FIG. 5C, the $6^{th}$ memory location of the memory region is written to. The hash value for the $6^{th}$ memory location, generated by the first hash function, is "1", whereas the hash value for the $6^{th}$ memory location, generated by the second hash function, is "3". A determination is made that the output of the two hash functions exists in write_history because bits two and four are detected in write_history. Accordingly, write_history is cleared and bits two and four of write_history are set to "1", i.e., write_history becomes "0101". Further, divider_count is decremented from "2" to "1" and write_count is incremented.

Figure 5D:
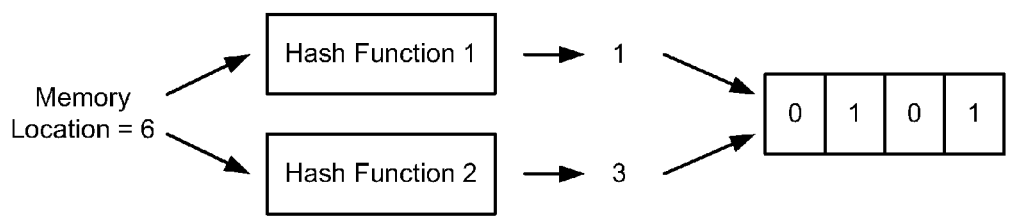

In FIG. 5D, the $6^{th}$ memory location of the memory region is written to. The hash value for the $6^{th}$ memory location, generated by the first hash function, is "1", whereas the hash value for the $6^{th}$ memory location, generated by the second hash function, is "3". A determination is made that the output of the two hash functions exists in write_history. Accordingly, write_history is cleared and bits two and four of write_history are set to "1", i.e., write_history becomes "0101". Further, divider_count is decremented from "1" to "0". Because divider_count=0, a wear level operation is performed, and divider_count is reset to "2" and write_count is incremented.

In the above use case scenario, a user is writing to the memory region for which variable rate wear leveling is implemented, as described in FIGS. 3 and 4, in accordance with an embodiment of the technology, until the memory region reaches the end of its life cycle. The end of the life cycle is reached when at least one of the memory locations of the memory region has reached the number of permissible writes. Different write patterns are used to assess performance of the variable rate wear leveling control algorithm. Specifically, (a) writes are performed sequentially across the memory locations of the memory region; (b) writes are performed uniformly but randomly across the memory locations of the memory region, (c) writes are performed with 1% of the memory locations being written to repeatedly (hot locations) and 99% of the memory locations being written to uniformly but randomly; (d) writes are performed to 1% of the memory locations only; and (e) writes are performed to a single memory location only.

The same write patterns are applied to a second memory region that is managed using a fixed rate wear leveling control algorithm, where after each write operation a wear level operation is performed.

Figure 6A:
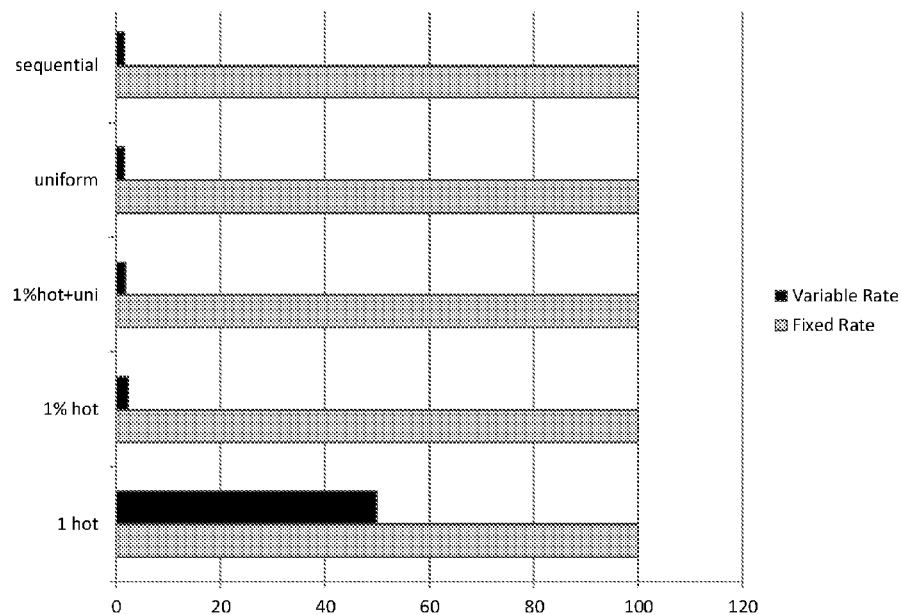
FIGS. 6A-6B show performance data obtained using wear leveling in accordance with an embodiment of the technology, in comparison to performance data obtained using conventional wear leveling.

FIG. 6A shows a chart comparing the wear leveling overhead (in percent) caused by the wear leveling control algorithm in accordance with one or more embodiments of the technology. The black bars represent data for the variable rate wear leveling control algorithm, in accordance with an embodiment of the technology, whereas the gray bars represent data for the fixed rate wear leveling control algorithm. As can be seen, the fixed rate wear level algorithm causes a 100% wear leveling overhead (x-axis), i.e., for each actual write to a memory location, one wear level operation is performed. This wear level overhead is necessary in order to accommodate the scenario of a single hot location that is being written to repeatedly. In contrast, the variable rate wear level algorithm, as used in the described scenario generates significantly less wear level overhead. For the single location write (above described write pattern (e)), the wear level overhead is 50%, i.e., for two actual writes to the memory location, one wear level operation is performed. For all other write patterns, the overhead is in the single digit range. Accordingly, the variable rate wear leveling algorithm outperforms the fixed rate wear leveling algorithm by performing fewer wear leveling operations, thereby improving performance and reducing wear.

Figure 6B:
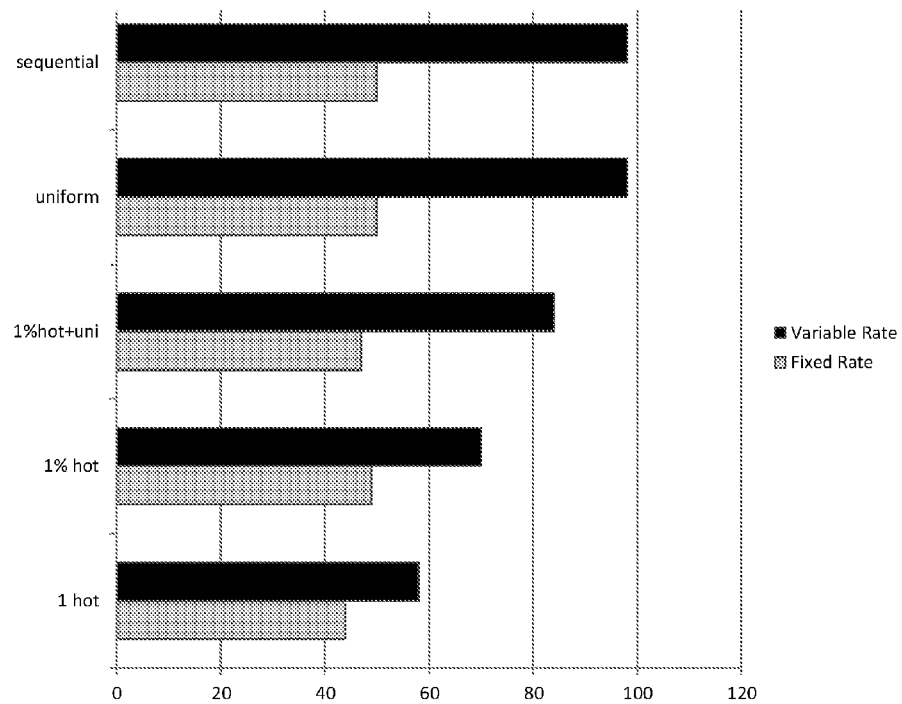

FIG. 6B shows a chart comparing the total bytes (in percent) that may be written to a memory region before the memory region fails in accordance with one or more embodiments of the technology. The total bytes written to a memory region are a measure for the evenness of the writes across the memory region. A less even distribution results in a particular memory location reaching its wear limit at an earlier point in time while other memory locations are still usable, whereas an even distribution results in all memory locations reaching their wear limit at about the same point in time. A perfectly even distribution of writes would thus result in a 100% value of total bytes written to the memory region. As can be seen in FIG. 6B, the variable rate wear level algorithm, in accordance with an embodiments of the technology, achieves close to the maximally possible 100% of theoretically possible writes across the memory region, for sequential and uniform write patterns, whereas the fixed rate wear level algorithm reaches only approximately 50%. For other write patterns, the variable rate wear level algorithm, also significantly outperforms the fixed rate wear level algorithm.

Those skilled in the art will appreciate that the technology is not limited to the examples described above.

Embodiments of the technology may enable solid state storage systems to mitigate the effects of repeated writing to solid state memory of the solid state storage system that would otherwise, over time, result in failure of the solid state memory. In a system in accordance with one or more embodiments of the technology, wear leveling is used to reduce the effect of frequently written data fragments on individual memory locations.

In one or more embodiments of the technology, the execution of wear level operations is controlled in a manner such that wear level operations are performed only when multiple write operations to the same memory locations are detected. Accordingly, unnecessary wear level operations that would impair read/write performance and that would cause additional wear of the memory may be avoided. The frequency of the wear level operations being performed may adjust from no wear level operations at all (when writes are evenly distributed across the memory region) to as rapid as necessary to accommodate the worst case scenario in which only a single memory location is being written to. Thus, a memory region being managed in accordance with one or more embodiments of the technology may wear relatively homogenously without requiring an excessive number of wear level operations. As a result, an increased number of overall write cycles may be performed, prior to failure of the memory region.

Embodiments of the technology may be implemented using limited resources. Specifically, a small amount of volatile memory may be sufficient to detect repetitive writes to the memory locations of the memory region, using the write_history variable. Embodiments of the technology may thus be implemented using for example, a small random access memory (RAM) region or registers, e.g. within an FPGA.

Embodiments of the technology may thus obviate the need for large tables to separately track writes to each of the memory locations in the memory region, without sacrificing wear level performance. The technology may thus be especially useful to manage write-in-place non-volatile memory (WiPNVM) that may have relatively small memory locations (e.g., a few bytes only), and where a table for tracking writes to individual memory locations would thus be particularly large. Local implementation, for example, directly on the FPGA or processor that establishes the interface to the memory region, may result in superior performance at a reduced cost.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for controlling wear level operations in solid state memory, the method comprising:
  receiving a request to write to a memory location identified by a write address of the solid state memory;
  generating a write address hash from the write address;
  making a first determination that a write history for a memory region comprises the write address hash, and based on the first determination:
    clearing the write history;
    storing the write address hash in the write history; and
    making a second determination that a wear level operation is due, and based on the second determination:
      performing the wear level operation.

2. The method of claim 1, further comprising writing to the memory location identified by the write address.

3. The method of claim 2, further comprising, after writing to the memory location identified by the write address, incrementing a counter of total writes.

4. The method of claim 3, further comprising making a third determination, using the counter of total writes, that the memory region is worn, and based on the third determination, discontinuing using the memory region.

5. The method of claim 1 further comprising:
  receiving a second request to write to a second memory location identified by a second write address of the solid state memory;
  generating a second write address hash from the second write address;
  making a third determination that the write history does not comprise the second write address hash, and based on the third determination:
    storing the write address hash in the write history.

6. The method of claim 1,
  wherein the write address hash comprises two hash values,
  wherein each of the two hash values is generated by a separate hash function; and
  wherein the hash functions are independent from one another.

7. The method of claim 6, wherein each of the hash functions is configured to accept write addresses in the range of the memory region to generate hash values in the range matching the size of the write history.

8. The method of claim 1, wherein making the second determination that the wear level operation is due comprises comparing a counter for the number of duplicate writes to a memory location, observed since the most recent wear level operation, to a specified repetitive write limit.

9. The method of claim 8,
  wherein the counter is updated each time a duplicate write to a memory location is detected; and
  wherein the update increment is adjusted based on the probability that the detected duplicate write to the memory location is a true positive.

10. A storage appliance, comprising:
  storage modules comprising solid state memory,
  wherein the storage appliance is configured to:
    receive a request to write to a memory location in a memory region of the solid state memory, identified by a write address;
    generate a write address hash from the write address;
    make a first determination that a write history for the memory region comprises the write address hash, and based on the first determination:
      clear the write history;
      store the write address hash in the write history; and
      make a second determination that a wear level operation is due, and based on the second determination:
        perform the wear level operation.

11. The storage appliance of claim 10,
  wherein the storage appliance is further configured to:
    write to the memory location identified by the write address; and
    after writing to the memory location identified by the write address, increment a counter of total writes.

12. The storage appliance of claim 11,
  wherein the storage appliance is further configured to:
    make a third determination, using the counter of total writes, that the memory region is worn, and based on the third determination, discontinue using the memory region.

13. The storage appliance of claim 10,
  wherein the storage appliance is further configured to:
    receive a second request to write to a second memory location identified by a second write address of the solid state memory;
    generate a second write address hash from the second write address; and
    make a third determination that the write history does not comprise the second write address hash, and based on the third determination:
      store the write address hash in the write history.

14. The storage appliance of claim 10,
wherein the write address hash comprises two hash values,
wherein each of the two hash values is generated by a separate hash function;
wherein the hash functions are independent from one another; and
wherein each of the hash functions is configured to accept write addresses in the range of the memory region to generate hash values in the range matching the size of the write history.

15. The storage appliance of claim 10, wherein making the second determination that the wear level operation is due comprises comparing a counter for the number of duplicate writes to a memory location, observed since the most recent wear level operation, to a specified repetitive write limit.

16. The storage appliance of claim 15,
wherein the counter is updated each time a duplicate write to a memory location is detected; and
wherein the update increment is adjusted based on the probability that the detected duplicate write to the memory location is a true positive.

17. A non-transitory computer readable medium (CRM) comprising instructions that enable a storage appliance to:
receive a request to write to a memory location of solid state memory of the storage appliance, identified by a write address;
generate a write address hash from the write address;
make a first determination that a write history for a memory region comprises the write address hash, and based on the first determination:
 clear the write history;
 store the write address hash in the write history; and
 make a second determination that a wear level operation is due, and based on the second determination:
  perform the wear level operation.

18. The non-transitory CRM of claim 17, further comprising instructions that enable the storage appliance to:
write to the memory location identified by the write address; and
after writing to the memory location identified by the write address, increment a counter of total writes.

19. The non-transitory CRM of claim 18, further comprising instructions that enable the storage appliance to:
make a third determination, using the counter of total writes, that the memory region is worn, and based on the third determination, discontinue using the memory region.

20. The non-transitory CRM of claim 17 further comprising instructions that enable the storage appliance to:
receive a second request to write to a second memory location identified by a second write address of the solid state memory;
generate a second write address hash from the second write address;
make a third determination that the write history does not comprise the second write address hash, and based on the third determination:
 store the write address hash in the write history.

21. The non-transitory CRM of claim 17,
wherein the write address hash comprises two hash values,
wherein each of the two hash values is generated by a separate hash function;
wherein the hash functions are independent from one another; and
wherein each of the hash functions is configured to accept write addresses in the range of the memory region to generate hash values in the range matching the size of the write history.

22. The non-transitory CRM of claim 17, wherein making the second determination that the wear level operation is due comprises comparing a counter for the number of duplicate writes to a memory location, observed since the most recent wear level operation, to a specified repetitive write limit.

23. The non-transitory CRM of claim 22,
wherein the counter is updated each time a duplicate write to a memory location is detected; and
wherein the update increment is adjusted based on the probability that the detected duplicate write to the memory location is a true positive.

* * * * *